United States Patent [19]

Niedermeyer

[11] 4,206,747
[45] Jun. 10, 1980

[54] SOLAR ENERGY COLLECTOR

[76] Inventor: William P. Niedermeyer, 1024 Mt. Mary Dr., Green Bay, Wis. 54304

[21] Appl. No.: 844,924

[22] Filed: Oct. 25, 1977

[51] Int. Cl.² ................................................ F24J 3/02
[52] U.S. Cl. .................................... 126/438; 126/449; 350/288
[58] Field of Search ............... 350/288, 293, 296, 310, 350/289; 60/641; 248/59, 327, 354 P; 126/270, 271, 438, 439, 442, 443, 449

[56] References Cited

U.S. PATENT DOCUMENTS

| | | | |
|---|---|---|---|
| 1,661,473 | 3/1928 | Goddard et al. | 126/271 |
| 2,339,565 | 1/1944 | Goldberg et al. | 248/59 X |
| 3,321,012 | 5/1967 | Hervey | 126/271 |
| 3,495,796 | 2/1970 | Fruh | 248/327 |
| 3,957,030 | 5/1976 | Davis | 126/439 |
| 3,996,917 | 12/1976 | Trihey | 126/271 |
| 4,003,366 | 1/1977 | Lightfoot | 237/1 A |
| 4,011,855 | 3/1977 | Eshelman | 126/271 |
| 4,011,858 | 3/1977 | Hurkett | 126/271 |
| 4,059,093 | 11/1977 | Knowles et al. | 126/271 |
| 4,077,392 | 3/1978 | Garner | 350/293 |

FOREIGN PATENT DOCUMENTS 2458303   6/1976   Fed. Rep. of Germany ........... 126/438

Primary Examiner—James C. Yeung
Assistant Examiner—Larry Jones
Attorney, Agent, or Firm—Francis J. Bouda

[57] ABSTRACT

This invention relates a solar energy collector device having a central heat absorber of unique shape, said absorber including planar surfaces extending therefrom, said planar surfaces connected to a tube-like central member to increase the absorption capacity thereof.

2 Claims, 13 Drawing Figures

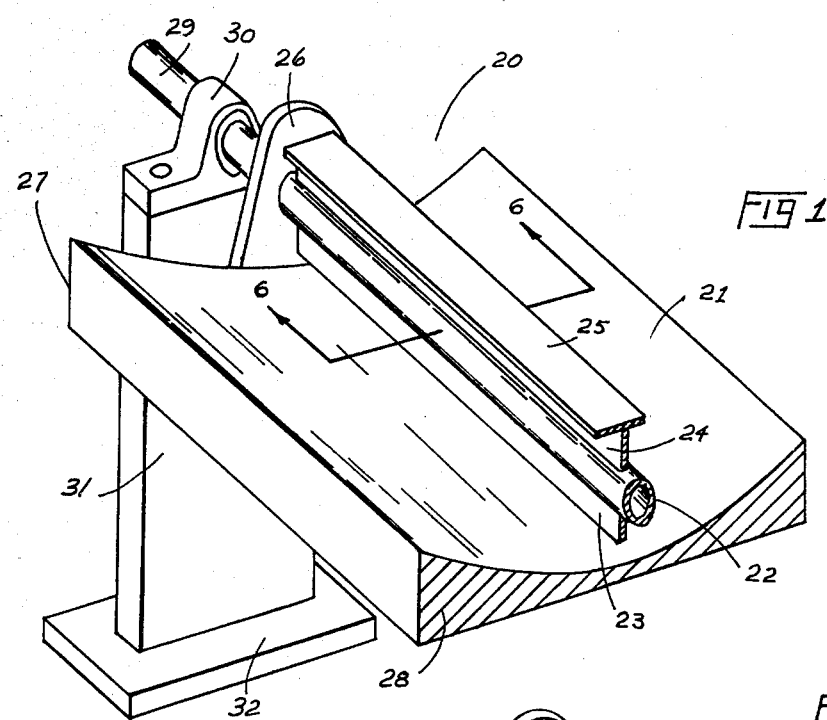
Fig 1
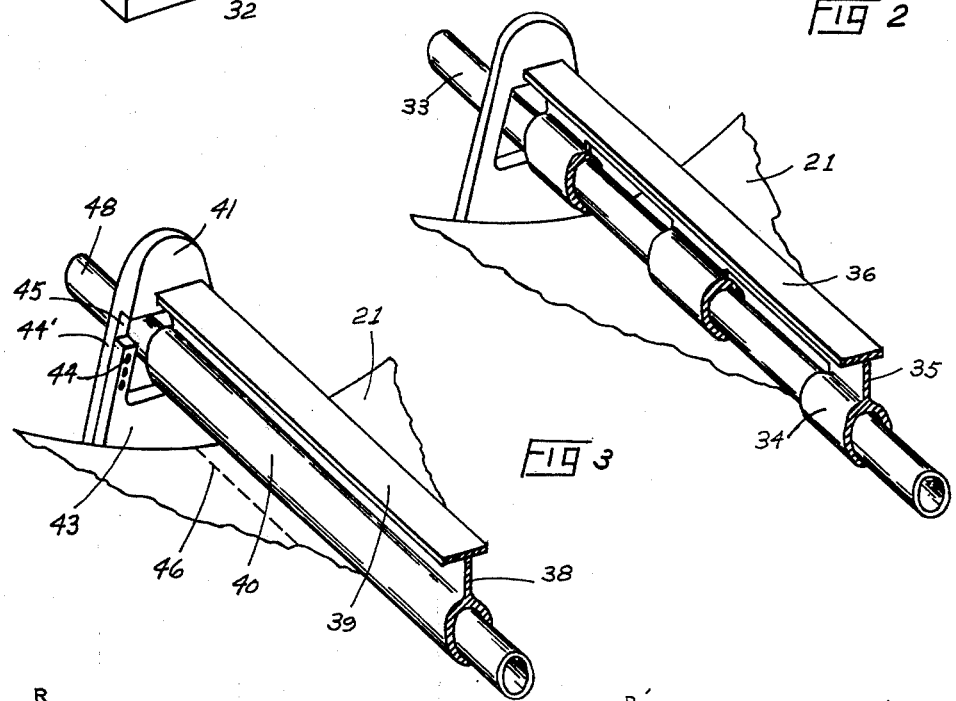
Fig 2
Fig 3
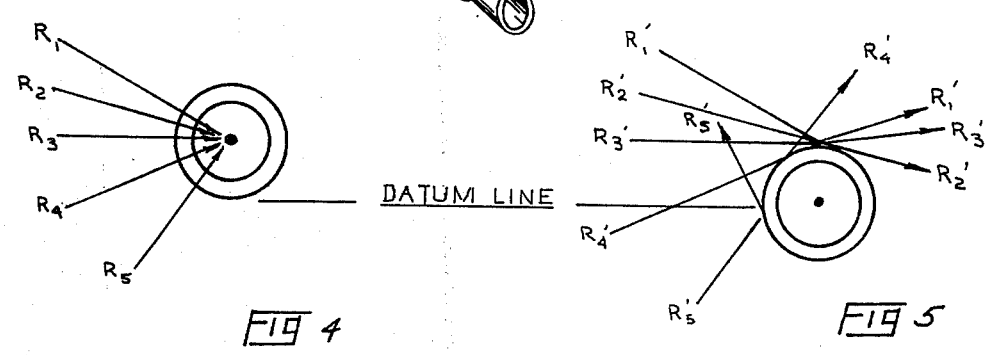
Fig 4
Fig 5

SOLAR ENERGY COLLECTOR

BACKGROUND OF THE INVENTION

Concentrating collectors with ratios in the magnitude of 50:1 are commercially available. Such collectors are shown as early as Abbot U.S. Pat. No. 1,855,815. These concentrating collectors are used in higher temperature applications, i.e., fluid output ranges from 250 degrees F. to 500 degrees F. and above. The concentrating ratio is defined as the ratio of the reflector "opening" measured along a chordal line transverse the aperature divided by the outside diameter of the absorber tube.

Fabrication inaccuracies causing variations in the angle of the reflector surface are almost impossible to avoid within reasonable manufacturing cost objectives. These small variations result in diffused rays that are visible as a secondary "band" of light when they impinge against a thin opaque substrate which is co-planer with a line central to the reflector surface and the focal line. A narrow intense white band of light at the focal line is visible as polarized light that is focused correctly. In addition, accumulated errors in fabrication of the reflector surface show as a less intense and wider (vertical height) band of light, usually above and below the focused light rays.

OBJECTIVES OF THE INVENTION

The primary objective of this invention is to provide a solar ray absorber tube that will effectively absorb misdirected rays.

Another object of this invention is to utilize shapes that increase concentrated solar slux and impart rigidity to the central tube absorber means.

Another object of this invention is to provide shaped, solar-ray absorber tubes that will decrease loss by providing a secondary absorption surface for radiation deflected from the central tube.

Another objective of this invention is to provide a solar energy collector with a reflector-absorber means having a mounting arrangement which allows for easy adjustment for focusing concentrated rays on the central absorption means.

Another object of this invention is to provide absorption sections that retain anti-deflection properties as the "working" angle of the reflector changes.

Another object of this invention is to provide absorption-heat transfer means wherein the heat transfer fluid carrying member can be arranged selectively for rotatable or non-rotatable use.

DESCRIPTION OF THE DRAWINGS

FIG. 1 is a fragmentary perspective view of a solar energy collector showing one embodiment of the present invention.

FIG. 2 is a fragmentary perspective view similar to FIG. 1 showing another embodiment of the present invention.

FIG. 3 is a fragmentary perspective view similar to FIG. 2 with full surface rotating contact of the extended absorber about the central tube absorber-transfer means.

FIG. 4 is a diagrammatic view of solar rays impinging normal to the surface of a central circular tube.

FIG. 5 is a diagrammatic view of the same central tube in FIG. 4, showing the effect of mis-directed solar rays.

DESCRIPTION OF THE INVENTION

Figure 6:
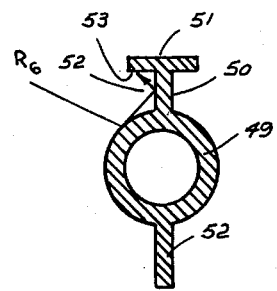
FIG. 6 is a cross-sectional view taken generally along line 6—6 of FIG. 1.

FIG. 1 shows a solar energy collector 20 having a collecting-reflecting surface 21 directing light rays to a fluid carrying absorber means 22.

Fin-like portions 23 and 24 extend radially outwardly from the central tube 22. Horizontal portion 25 can be an integral part of member 24, or can be a separate member attached thereto.

The absorption-conductor assembly is supported at one end by bracket 26 which is fastened to one end 27 of reflector surface 21. At the other end, a similar bracket would be fastened. In this arrangement, the reflector supports 27, reflector surface 21, absorber assembly 22-23-24-25, and brackets 26 comprise a working assembly supported by pipe 29 rotatably mounted in bearings 30, said bearings being supported by pedestals 31 resting on baseplates 32.

With the arrangement of FIG. 1, the angle of the "working" assembly can be changed by rotation of pipe 29. A suitable coupling on the end of pipe 29 connects collectors in series and such coupling may include a rotary joint.

FIG. 2 is a similar collector device wherein the "working assembly" is arranged for rotation about a fixed non-rotating pipe 33. Segmental bosses 34 have internal bushings with close tolerance fit on the pipe 33 for efficient heat transfer thereto. All external surfaces of 33-34-35 and 36 are treated to maximize absorption of rays reflected thereto from surface 21.

FIG. 3 shows absorption means 38 and 39 as integral extrusions of full length boss 40 rigidly affixed to end bracket 41. Lower bracket 43 is secured through hole 44 and slot 44 (not shown) in top bracket 41 thereby providing a sliding relationship allowing changes in the space 45, with the desired objective of changing the distance between a central line 46 on reflector surface 21 and the focal line. Other means can be used for vernier adjustment to change the abovementioned spacing thereby insuring that the focal line of light rays to impinge on the most effective vertical location on the absorber boss 40 or extension 38. In this instance, fluid carrying tube 48 is in fixed relationship with the reflector surface 21 and the absorber means is rotatable. It is within the scope of this invention to adjust the distance between said lines in parallel or non-parallel relationship.

FIG. 4 shows rays $R_1$ through $R_5$ being reflected from a parabolic reflector surface (not shown) toward a focal point (line) coincident with the axis of the fluid carrying tube. This illustration assumes perfect reflector surface accuracy according to curve $X^2-2PY$ and perfect focusing of rays on the focal line.

FIG. 5 illustrates the effect of improper focusing, for example, if the distance between a central line on the reflector surface and the focal line is too short due to fabrication errors or loose assembly tolerances. It also illustrates the effect when radiation from a perfect reflector surface is directed toward a central lineal section of the fluid carrying tubes 22, 33 or 48 when said tubes are supported in a manner that permits deflection equal to tube radius—a disadvantageous result that is encountered with high magnitude concentration ratios, since by definition, said high ratios dictate smaller diameter tubes for a specific reflector curve.

It is noted that extension fins on the absorption means will increase total radiation by absorbing diffused secondary rays, and that said extensions can be advantageously positioned to increase rigidity and minimize deflection of the absorber fluid carrying means.

FIG. 6 is a cross section of a rotating absorber-fluid carrying—heat transfer means with central tube section 49, top extension 50, extension 51 normal to incoming solar rays and bottom extension 52. Note deflected rays 46 would impinge on surfaces 52 and 53, said surfaces thus increasing efficiency by absorbing rays of the "secondary" band.

Figure 7:
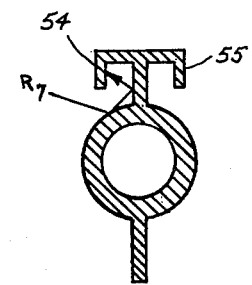
FIG. 7 is a view similar to FIG. 6 with additional absorption surfaces added.

FIG. 7 is another embodiment of a rotating absorber assembly with extensions 54 and 55 added to further increase absorption of certain secondary rays.

Figure 8:
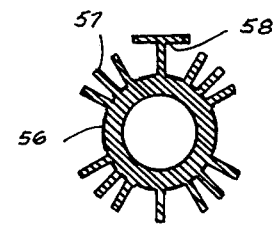
FIG. 8 is a cross-sectional view similar to FIG. 6 of another central tube showing substantially radially extending fins.

FIG. 8 is another cross section showing a rotating central tubular member 56 with radially extending fins 57. Surface 58 functions like surface 53 of FIG. 6 but may be omitted, if desired. The construction of FIG. 8 is beneficial to lend rigidity over a wide range of angular rotation of the collector surface.

Figure 9:
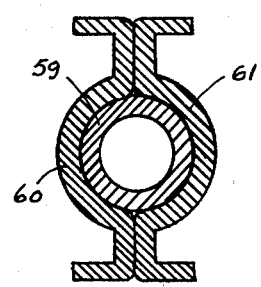
FIG. 9 is a cross-sectional view similar to FIG. 6 of a central conductor tube arranged for non-rotational mounting.

FIG. 9 shows an assembly useful for stationary mounting of a fluid-carrying tube 59. The outer absorption members 60-61 rotate about the tube 59 in fixed relationship with the reflector surface 21.

Figure 10:
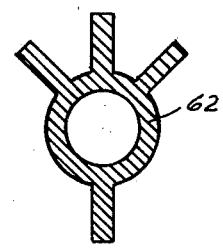
FIG. 10 is another cross-sectional view similar to FIG. 6 showing an arrangement to minimize deflection.

FIG. 10 shows an integral fluid-carrying-heat transfer member 62 effective to add rigidity for limited reflector-absorber rotation of approximately 45 degrees.

Figure 11:
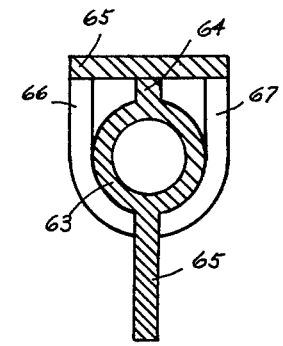
FIG. 11 is another cross sectional view similar to FIG. 6 showing a partial enclosure.

FIG. 11 shows central tubular fluid carrying means 63 with extensions 64 and 65 arranged for external rotating and non-rotating relationship with the reflector surface. Top member 65 collects a limited portion of the incoming rays and co-acts with fin 64 to transmit direct rays to 63. Side enclosure members 66 and 67 reduce convective heat loss.

Figure 12:
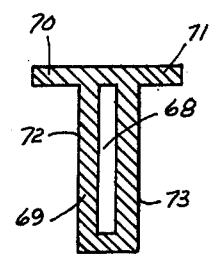
FIG. 12 is another cross sectional view similar to FIG. 6 showing a rectangular fluid carrying absorber with extended absorption surfaces.

FIG. 12 shows a rectangular fluid conduit 68 enclosed by a member consisting of rectangular section 69 and extensions 70-71 to absorb rays directed upward (opposite to direction of incoming rays) and reflected from side surfaces 72 and 73 thereof.

Figure 13:
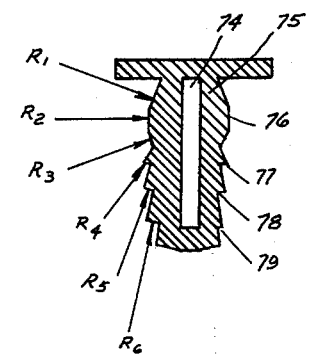
FIG. 13 is a view similar to FIG. 12 showing irregular surfaces on the fluid carrying absorber.

FIG. 13 shows a rectangular fluid conduit 74 enclosed within a member 75 and a plurality of irregular external surfaces arranged to minimize reflective loss especially from rays reflected substantially opposed to the direction of incoming rays.

The invention is illustrated but not limited by the following description and data from testing.

EXAMPLE 1

For each parabolic curve tested (three results shown) the test fixture comprised of:

(a) a flexible reflective Nickel-Chrome plated copper sheet bent to conform to and be terminally supported at curved terminal ends by;

(b) a pair of concave parabolic shaped supports which are in juxtaposed planar relationship with and supported by;

(c) a pair of end frames (d) a plurality of wire pairs supported from said frames through holes in a guide plate, each of said wire pairs at different elevations, said wires mounted substantially within a plane coincident with a line central of the reflector surface and the focal point.

(e) supported by said wire pairs, a series of conductor (heat absorbing) sections, generally "T" or "Z" shaped, with the vertical legs thereof placed between each pair of wires.

TESTS-1 THROUGH 8

AVERAGE TEMPERATURE-DEGREES F.

| NO. | CONDUCTOR SHAPE | VERTICAL HT (IN) | HORIZ. W (IN) | REFLECTOR SECTION ($X^2 - 2PY$) | | |
|---|---|---|---|---|---|---|
| | | | | P = 6 | P = 8 | P = 10 |
| | 0 | .250 | .250 | 174.5 | 165.8 | N.T. |
| | 0 | .375 | .375 | 185.4 | 167.8 | N.T. |
| | 0 | .625 | .625 | 190.8 | 165.3 | N.T. |
| 1. | T | .375 | .125 | 197.3 | N.T. | 134.5 |
| 2. | T | .375 | .500 | 203.0 | N.T. | 147.7 |
| 3. | T | .375 | .750 | 196.6 | N.T. | 149.2 |
| 4. | Z | .375 | .064 | 198.2 | 160.8 | 150.8 |
| 5. | Z | .375 | .125 | 226.4 | 161.3 | 157.5 |
| 6. | T | .375 | .250 | 230.8 | 164.8 | 151.7 |
| 7. | T | .375 | .500 | N.T. | 159.8 | 165.5 |
| 8. | T | .500 | .375 | N.T. | 163.0 | N.T. |
| 9. | T | .625 | .375 | 201.8 | 165.5 | 176.5 |
| 10. | Z | .625 | .125 | 193.5 | 159.6 | 179.3 |

N.T. - Not Tested

The largest aperature (P=10) had concentration ratios ranging up to 100:1 depending on the section used for calculating the ratio, but did not perform as well as the P=6 reflector which had a ratio of about 60:1.

Intermediate reflector curve P=8 performed less effectively than P=6.

With the top section (normal to incoming rays) of the conductor shape obstructing clear visual observation of band intensity on the vertical leg, it was assumed that properly focused narrow (intense) light bands were impinging on the vertical legs. This did not explain low performance compared with P=6, but it was assumed that the extended portions of sections 9 and 10 were sufficiently long to interrupt the high intensity band. Note the higher performance results for section 9 and 10.

When the tests were completed, the conductor sections were removed and with an opaque planar surface interposed between wire pairs, visual observations discussed above were made. It was noted that the light band impinging within the normal "range" of conductor incidence was comprised of secondary rays without any primary light rays being observed. The test fixture was moved to different angles from horizontal and it was discovered that the high intensity band of light existed but in normal testing it fell below the bottom of all test conductor (absorber) sections on curves P=8 and P=10 (only).

It is clear that all of the light impinging on the test conductor sections was due to diffused rays, and therefore represented a significant contribution to the total energy available, given the practical limitations of using less than a perfect parabolic reflecting surface. These results also explained better performance of reflector surface P=6, said surface being of sufficient accuracy to reflect polarized light to the conductor sections used therewith.

Due to this observation and conclusion, it is evident that two factors will increase efficiency in a practical device. First, a means of adjusting the distance between the reflector and the absorber member properly to focus high intensity primary rays. Second, additional extended absorbing members to utilize energy that would normally bypass the conductor-fluid carrying member as diffused and misdirected rays.

It is to be understood that the present invention may be embodied in other specific forms without departing from the spirit and special attributes hereof, and it is, therefore, desired that the present embodiments be considered in all respects as illustrative and, therefore, not restrictive, reference being made to the appended claims rather than to the foregoing description to indicate the scope of the invention.

Having thus described my invention, what I claim as new and desire to protect by Letters Patent are the following:

1. A linear parabolic reflective focusing concentrating solar energy collector device for absorbing solar rays including a horizontally extending fluid carrying member centrally located in a vertical plane coincident with the apex of the parabolic reflector surface, said fluid carrying member being spaced above the apex and above the zeniths of said reflective surface, at least one absorption surface operatively connected to said fluid carrying member and extending to at least the ends of said reflective surface parallel to the fluid carrying member, said fluid carrying member and absorption surface arranged to absorb direct solar rays, linear focused rays, and diffused reflected solar rays, said fluid carrying member being rectangular with its major dimension parallel to the direction of incoming solar rays, a plurality of surfaces being arranged at selective angles and symmetrical with respect to a central plane coincident with the focal line and the apex of the reflector surface, said angled surfaces being at least in part parallel to the axis of the fluid carrying member, each of said surfaces being arranged perpendicularly to the direction of solar rays impinging on a line central thereto.

2. A linear parabolic reflective focusing concentrating solar energy collector device for absorbing solar rays including a horizontally extending fluid carrying member centrally located in a vertical plane coincident with the apex of the parabolic reflector surface, said fluid carrying member being spaced above the apex and above the zeniths of said reflective surface, at least one absorption surface operatively connected to said fluid carrying member and extending to at least the ends of said reflective surface parallel to the fluid carrying member, said fluid carrying member and absorption surface arranged to absorb direct solar rays, linear focused rays, and diffused reflected solar rays, said linear parabolic reflecting surface being supported from, and arranged for rotation about, a fluid carrying member located concentrically about a focal line, said supports being fixedly attached to the centrally located fluid carrying member, said member mounted for rotation within journals mounted externally of, and in close proximity to, said supports, said supporting members including adjustment means for changing the focal distance between the reflector surface and said fluid carrying member.

* * * * *